UNITED STATES PATENT OFFICE.

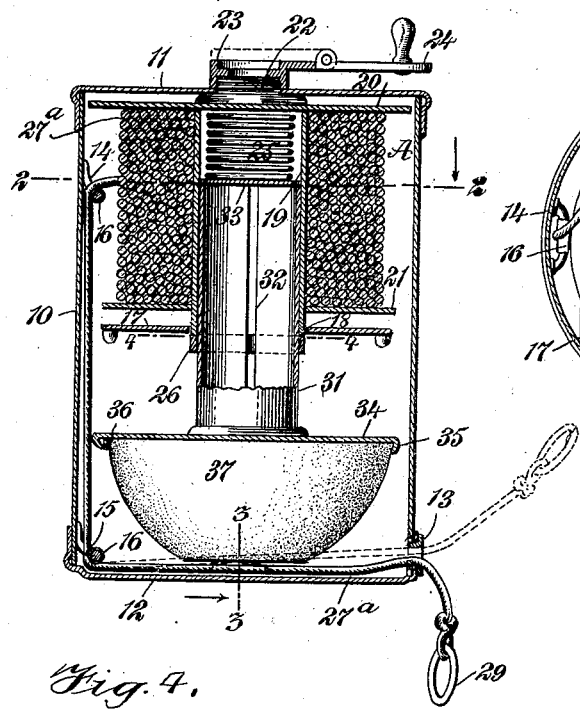

WILLIAM C. FILSON, OF POINT PLEASANT, WEST VIRGINIA, ASSIGNOR OF TWO-THIRDS TO CHARLES F. FILSON AND FRANK L. FILSON, OF POINT PLEASANT, WEST VIRGINIA.

SELF-CHALKING HOLDER FOR CHALK-LINES.

SPECIFICATION forming part of Letters Patent No. 712,283, dated October 28, 1902.

Application filed April 12, 1902. Serial No. 102,590. (No model.)

*To all whom it may concern:*

Be it known that I, WILLIAM C. FILSON, a citizen of the United States, and a resident of Point Pleasant, in the county of Mason and State of West Virginia, have invented a new and Improved Self-Chalking Holder for Chalk-Lines, of which the following is a full, clear, and exact description.

The purpose of the invention is to provide a simple, durable, and economic form of device adapted to contain a reel and chalk-line and a cake of chalk, all of which are easily placed in or removed from a receptacle or case, and to provide means whereby when the line is unreeled the cake of chalk will be rotated with the reel and the line will engage with the chalk, but wherein when the line is being wound upon the reel the chalk will remain stationary and the line will be out of engagement with it, thus preventing an undue waste of chalk.

Another object of the invention is to provide means at the exterior of the device for imparting movement to the reel and chalk-holder.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the device, the chalk appearing in side elevation. Fig. 2 is a horizontal section on the line 2 2 of Fig. 1. Fig. 3 is a detail vertical section taken on the line 3 3 of Fig. 1, and Fig. 4 is a detail horizontal section taken practically on the line 4 4 of Fig. 1.

The receptacle or case consists of a cylindrical body 10, provided with removable caps 11 and 12 at its ends, and in the flange of the bottom cap 12 an opening 13 is made, registering with an opening in the bottom edge of the body 10, and at the opposite side of said body interiorly-located upper and lower loop-guides 14 and 15 are secured, as is shown in Fig. 1, and each guide carries a friction-roller 16, as is illustrated in Fig. 2. About centrally within the body 10 of the receptacle or case a horizontal partition 17 is fastened, which partition may be rectangular, as is shown in Fig. 2, and in the partition a central opening 18 is made. The reel A consists of a tubular core 19, an upper disk head 20, which extends across the tubular body, and a second and lower disk head 21, which surrounds the tubular body near its inner end and is attached thereto in any suitable or approved manner. A lug is located at the central portion of the upper disk head 20 of the reel A, having a threaded section 22, and this threaded section passes out through an opening in the upper cap 11 of the receptacle or case and is screwed into a socket 23, having a handle 24 hinged thereto capable of folding out from the socket, as shown in positive lines in Fig. 1, and of folding upon the socket or partially entering the same, as shown in dotted lines in the same figure. A coiled spring 25 is located within the tubular body-section 19 of the reel A, and this spring at its upper end may be and usually is attached to the disk head 20 of the reel, and at the inner end of the tubular body 19 of the reel A a spiral spring 26 is secured at one of its ends or is made integral at said end with the tubular body, and at the inner or free end of the spiral spring 26 a hook extension 27 is formed. The line 27ª is wound around the body of the reel A between its head-sections 20 and 21, and an end of the line is carried down through the loop-guides 14 and 15 in engagement with the friction-rollers 16 thereon, as is illustrated in Fig. 1, and the said line is then carried to the inner face of the bottom head 12 of the receptacle or case, where it is made to enter a central groove or channel 28, (shown best in Fig. 3,) and is conducted out through the opening 13 in the receptacle or case, the line terminating at its outer end in a ring 29 or other enlargement, whereby the outer end of the line cannot be drawn into the receptacle through the said opening 13. At each side of the groove or channel 28 and at the central inner portion of the lower cap 12 of the case or receptacle lugs 30 are formed, (shown best in Fig. 3,) and these lugs are usually produced by striking upward the material forming the bottom head 12. The groove or channel 28 is likewise usually produced by forcing down the metal of the said head 12 between the said lugs 30. These lugs 30 are adapted to support the bottom portion of a cake of chalk 37, to be hereinafter more particularly referred to, and to hold the said chalk when the said line is in the channel 28 from engagement with the line, and the line lies in said channel out of engagement with the cake of chalk while the line is being wound up on the reel A, and as at such time no chalk is needed on the line there is no waste of material. When the line is drawn out or unreeled from the case or receptacle, it is naturally carried upward and assumes the position shown in dotted lines in Fig. 1, and the line as drawn out is brought in direct engagement with the cake of chalk 37 or other material used and is coated therewith, said cake of chalk being rotated by the movement of the reel in unwinding the line; but when the line is to be wound on the reel the holder for the chalk is disengaged from operative connection with the reel and the chalk remains stationary, so that there is practically no wear on the chalk at such time.

In connection with the reel A a tubular plunger 31 is provided having a longitudinal slot 32 produced therein and provided at its upper end with a head 33. This tubular plunger 31 is made to enter the tubular body 19 of the reel A, and the head of the plunger engages with the spring 25 in the reel and places said spring under compression. At the bottom portion of the plunger 31 a disk head 34 is secured in any suitable or approved manner, and this disk head is provided with an inwardly-inclined downwardly-extending marginal flange 35, and adjacent to said flange a partition 36 is secured to the under face of the disk head 34, as is particularly shown in Fig. 1. This disk or plunger head 34 is adapted to receive and hold a cake of chalk 37, which is preferably semispherical, having a flattened pole to rest upon the lugs 30 on the bottom cap 12 of the said receptacle, and the flat and wider portion of the cake of chalk 37 is forced upon the under face of the plunger-head 34 within the flange 35, and the partition 36 will shave off and straighten one portion of the upper edge of the cake of chalk 37, thus serving to hold it in position in the said plunger-head.

When the reel A is turned by the outward movement of the line 27ª, unwinding the line from the reel, the hook 27 on the spring 26 will enter the slot 32 of the plunger 31, and the said plunger will then turn with the reel and the cake of marking material 37 will be revolved; but when the reel A is turned to wind the line 27ª thereon the hook 27 of the spring 26 will disengage itself from the slot 32, and the plunger 31 and marking material carried thereby will remain stationary. The spring 25 in the reel imparts sufficient tension on the plunger 31 to feed the marking material 37 downward to the bottom of the case or receptacle as the said material is worn away.

A new cake of material may be readily placed in the device by simply removing the bottom cap 12, the line 27ª having been drawn outward a foot or so, and the reel may be readily removed by drawing off the upper cap 11, and a new line may be wound thereon when necessary.

Having thus described my invention, I claim as new and desire to secure by Letters Patent—

1. A chalking-holder for chalk-lines, consisting of a case or receptacle, a reel mounted to turn in the receptacle, guides for a chalk-line located within the said receptacle or case, a channel at one end of the receptacle or case, adapted to receive a chalk-line when passed from the guides, said receptacle or case being provided with an outlet for a chalk-line adjacent to said channel, and a chalk-holder also located within the said case or receptacle above the said channel, for the purpose set forth.

2. In a chalking-holder for chalk-lines, a case or receptacle, a reel mounted to revolve in the case or receptacle, means for turning the said reel from the exterior of the case or receptacle, a line attached to the said reel, guides at the side of the receptacle or case, over which the said line passes, a channel in the bottom of the receptacle or case, adapted to receive the outgoing portion of the line, the said case or receptacle having an outlet for the line at one end of the channel, and inwardly-extending lugs formed at the end of the case or receptacle, one at each side of said channel, a spring-controlled plunger guided in the said reel and provided with a head located over the said channel and said lugs and adapted to receive and hold a cake of marking material, whereby when the line is wound on the reel it remains in the channel out of engagement with the chalking material, and whereby when the line is drawn out from the receptacle or casing it engages with the chalk, as described.

3. In a chalking-holder for chalk-lines, a case or receptacle, a reel exteriorly operated and mounted to turn in the receptacle, a chalk-holder extending within a tubular section of the reel, the chalk-holder being provided with a longitudinal slot, and a spring having a hook extension carried by the reel, the hook extension being adapted to enter the slot in the chalk-holder when the reel is turned in one direction and to pass out therefrom when the reel is turned in an opposite direction, for the purpose described.

4. In a chalking-holder for chalk-lines, a reel provided with a tubular core and a spring therein, a chalk-holder comprising a plunger and head, the plunger entering the tubular core of the reel and provided with a longitudinal slot, a spring extension from the inner end of the core of the reel, and a hook projection from the said spring extension, adapted when the reel is turned in one direction to enter the slot in the plunger and cause said plunger to turn with said reel, as set forth.

5. In a chalking-holder for chalk-lines, a case or receptacle provided with a channel at one end extending from side to side, inwardly-projecting lugs at each side of the said channel, an outlet at one end of the channel, and guides located at the opposite end of the channel, as and for the purpose set forth.

6. In a chalking-holder for chalk-lines, the combination with a case or receptacle provided with a channel at one end extending from side to side, inwardly-projecting lugs at each side of the said channel, an outlet at one end of the channel, and guides located at the opposite end of the channel, of a reel mounted to turn in the receptacle, a line attached to the said reel, passed over the said guides along the said channel between the said lugs and out through the said outlet-opening in the case, a chalk-holder located over the channels and projections, and means substantially as described, for rotating the chalk-holder by the movement of the reel as the line is unwound therefrom, as described.

In testimony whereof I have signed my name to this specification in the presence of two subscribing witnesses.

WILLIAM C. FILSON.

Witnesses:
 T. STUBLING,
 H. L. ROBEY.